(No Model.)

E. D. STRONG.
TIRE FOR BICYCLES.

No. 583,270. Patented May 25, 1897.

Witnesses
Frank H. Deane.
Walter F. Driver

Inventor:
Elias D. Strong

UNITED STATES PATENT OFFICE.

ELIAS D. STRONG, OF CHICAGO, ILLINOIS, ASSIGNOR, BY DIRECT AND MESNE ASSIGNMENTS, TO ANTON C. EGGERS, OF BROOKLYN, NEW YORK.

TIRE FOR BICYCLES.

SPECIFICATION forming part of Letters Patent No. 583,270, dated May 25, 1897.

Application filed September 29, 1894. Serial No. 524,540. (No model.)

*To all whom it may concern:*

Be it known that I, ELIAS D. STRONG, a citizen of the United States, residing at Chicago, in the county of Cook and State of Illinois, have invented certain new and useful Improvements in Pneumatic Tires for Bicycles and other Vehicles and Methods of Making the Same, of which the following is a specification, reference being had to the accompanying drawings, in which—

Figure 1:
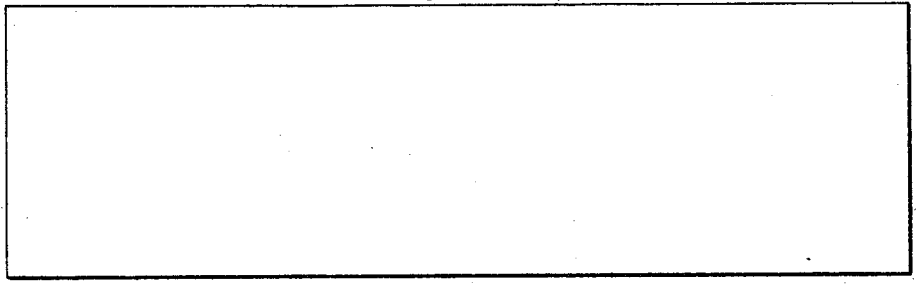
Figure 2:
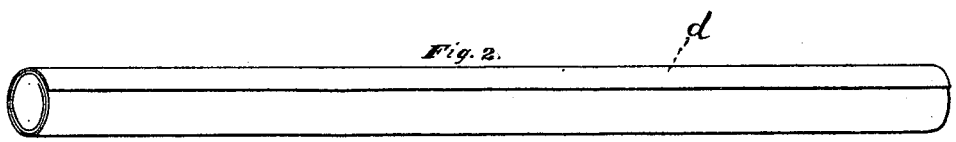
Figure 3:
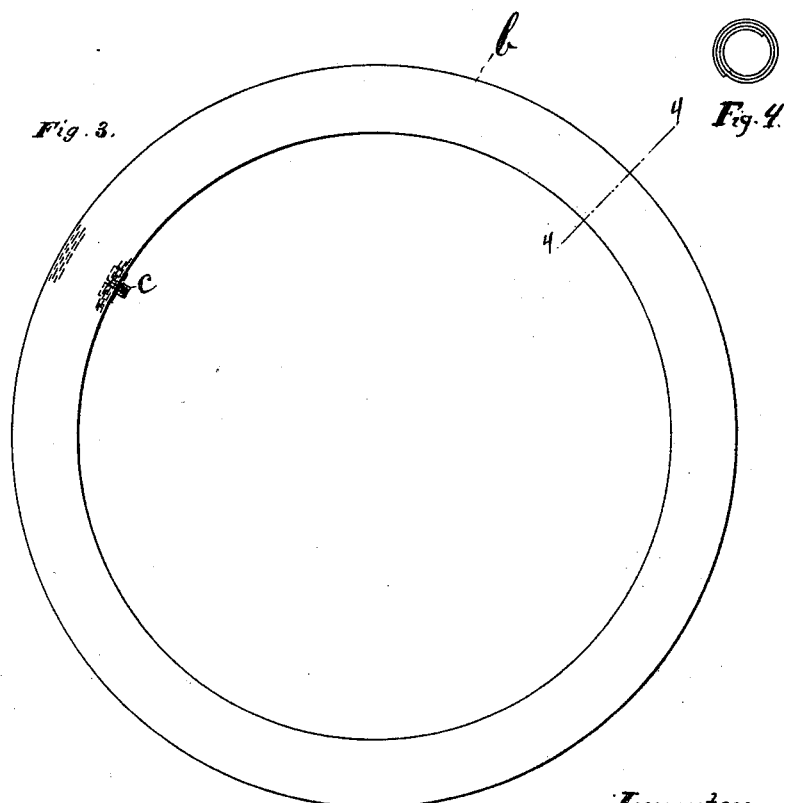

Figure 1 is a plan view of a sheet of flexible material from which the tire is formed. Fig. 2 is a view showing one method of forming the tire. Fig. 3 is a side view of a tire, and Fig. 4 is a cross-section on line 4 4 of Fig. 3.

Heretofore pneumatic tires have usually consisted of an interior pneumatic tube and an exterior covering therefor, such covering being usually so arranged as to inclose the pneumatic tube on all sides and to hold it upon the wheel-rim. Such tires are usually provided with a thick tread for the purpose of preventing sharp objects from puncturing the pneumatic tube, but notwithstanding this fact it frequently happens that the pneumatic tube is punctured, necessitating its being repaired before the tire can be used. To avoid this objection, various attempts have been made to provide a pneumatic tube which would be non-puncturing, the constructions used for this purpose generally consisting in certain arrangements of the pneumatic tube within the outer covering. Such constructions have not, however, given entire satisfaction, owing to the fact that the punctures were not closed sufficiently to prevent the escape of air.

It is one of the objects of my present invention to provide an improved tire which will overcome the objections incident to the constructions heretofore used and also to provide an improved method of making the same.

Figure 4:

To this end my invention consists in a pneumatic tube or tire formed of a roll of flexible material, giving the walls of the tire a spiral form in cross-section, as shown in Fig. 4. The different layers of the tube are not cemented together, so that they are free to move upon each other, the result being that when the tube is inflated the inner layer of the roll is forced outward into close contact with the adjacent layer, the movement being what may be called an "unwinding" movement. Such movement is communicated, though in a lesser degree, to each of the outer layers of the tube, the outer layer being least affected, owing to the fact that the outer edge of the roll is cemented to the roll, as will be hereinafter described. In case of puncture the puncturing device tends, as it meets each layer, to push such layer inward, causing the inner edge of the roll to roll up to a greater or less extent, the different layers moving upon each other. The result is that the successive layers present less resistance to the puncturing article and are consequently much less liable to be punctured; but even though all the layers should be punctured when the puncturing article is withdrawn the pressure of the air within the tube will cause the different layers to readjust themselves, the result being that the punctures formed in the different layers will not re-form in line with each other, and as the pressure of the air holds the different layers in close contact the escape of air through the punctures will be prevented.

In the manufacture of my improved tire I form an endless belt from a piece of good rubber or flexible material *a* of a width suitable to form the desired number of layers by uniting the ends of the piece by cement or in other suitable way. Two operators then place themselves at opposite sides of the band or belt and roll up the edge of the belt, thereby forming a continuous tube *b*, having two or more layers, depending upon the width of the belt. After the belt has been rolled up the outer edge is cemented to the body and a valve *c* inserted.

Instead of making the tire by first forming an endless belt, as above described, the sheet of material may be rolled up from edge to edge, forming a tube *d*, as shown in Fig. 2, after which the ends may be cemented together; but the method first described is that which I prefer.

In case the elasticity of the material is not sufficient to permit of the formation of a tire from a rectangular piece of material, as above described, the material may be cut in the form of a trapezoid—that is, having its ends oppositely inclined—so that when such ends are united a conical belt will be formed, when by commencing to roll at the edge of the cone having the lesser diameter a perfect tube may readily be formed.

Although my improved pneumatic tube is adapted to form a tire in itself without an exterior covering, it may be used with such a covering, if desired.

That which I claim as my invention, and desire to secure by Letters Patent, is—

1. The method of making pneumatic tires which consists in uniting the ends of a strip of suitable material to form a band or belt, rolling such belt into the form of a tube, and securing the outer edge thereof, substantially as described.

2. A single-tube pneumatic tire consisting of an elastic band rolled up to form a tube having two or more layers spirally arranged, the layers being free to move upon each other, whereby an air-tube and a covering therefor will be formed of a single piece, substantially as described.

3. The method of making pneumatic tires, which consists in uniting the ends of a strip of suitable material to form a band or belt, and rolling said belt in the form of a tube on its circular axis, substantially as set forth.

ELIAS D. STRONG.

Witnesses:
J. E. TAKKIN,
JOHN J. QUIRK.